United States Patent
Lee et al.

(10) Patent No.: US 11,901,583 B2
(45) Date of Patent: Feb. 13, 2024

(54) RECHARGEABLE BATTERY PACK

(71) Applicant: Samsung SDI Co., Ltd., Yongin-si (KR)

(72) Inventors: Hyeok Lee, Yongin-si (KR); Beomjoo Kim, Yongin-si (KR); Jaeho Kim, Yongin-si (KR); Kilseok Lee, Yongin-si (KR); Du-Seong Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 38 days.

(21) Appl. No.: 17/246,907

(22) Filed: May 3, 2021

(65) Prior Publication Data
US 2021/0384590 A1 Dec. 9, 2021

(30) Foreign Application Priority Data
Jun. 5, 2020 (KR) .................. 10-2020-0068338

(51) Int. Cl.
*H01M 50/507* (2021.01)
*H01M 50/559* (2021.01)
*H01M 50/213* (2021.01)

(52) U.S. Cl.
CPC ....... *H01M 50/507* (2021.01); *H01M 50/213* (2021.01); *H01M 50/559* (2021.01)

(58) Field of Classification Search
None
See application file for complete search history.

(56) References Cited

U.S. PATENT DOCUMENTS

| 9,722,230 B2 | 8/2017 | Fujiwara et al. |
| 2019/0372069 A1 | 12/2019 | Lee et al. |
| 2021/0050568 A1 | 2/2021 | Yang et al. |

FOREIGN PATENT DOCUMENTS

| JP | 5672294 B2 | 2/2015 |
| KR | 10-2019-0032887 A | 3/2019 |
| KR | 10-2020-0051393 A | 5/2020 |

OTHER PUBLICATIONS

Korean Office action for Application No. 10-2020-0068338, dated Oct. 18, 2023, 8 pages.

*Primary Examiner* — Carmen V Lyles-Irving
(74) *Attorney, Agent, or Firm* — Lewis Roca Rothgerber Christie LLP (57) ABSTRACT

A rechargeable battery pack includes: a battery housing provided with an inner space; a series of unit battery cells accommodated in the inner space, each unit battery cell including a first electrode terminal and a second electrode terminal at respective upper and lower portions thereof; and a bus bar module electrically connected to the first electrode terminal and the second electrode terminal of each unit battery cell. The bus bar module may include a first bus bar electrically connected to the first electrode terminal at the upper portion of the unit battery cells, a second bus bar electrically connected to the second electrode terminal at the lower portion of the unit battery cells, and a connector part electrically connected to the first bus bar and the second bus bar.

12 Claims, 11 Drawing Sheets

RECHARGEABLE BATTERY PACK

CROSS-REFERENCE TO RELATED APPLICATION

This application claims priority to and the benefit of Korean Patent Application No. 10-2020-0068338 filed in the Korean Intellectual Property Office on Jun. 5, 2020, the entire contents of which are incorporated herein by reference.

BACKGROUND

1. (a) Field

The present invention relates to a rechargeable battery pack with improved heat dissipation performance.

2. Description of the Related Art

A rechargeable battery is a battery that may be repeatedly charged and discharged, unlike a primary battery. A small-capacity rechargeable battery is used for a portable small electronic device such as a mobile phone, a laptop computer, and a camcorder, and a large-capacity rechargeable battery is used as a power source for driving a motor such as of an electric bicycle, a scooter, an electric vehicle, or a fork lift.

The rechargeable battery may be used as one unit battery cell, but may be used as a rechargeable battery pack in which a plurality of unit battery cells are connected in parallel or in series in order to implement a large-capacity battery. For example, the rechargeable battery pack may have a structure that uses a tab for connecting a plurality of unit battery cells in series or in parallel and draws out current from a tab of one side thereof.

However, when a plurality of unit battery cells are connected to a bus bar in a state in which a vent part is positioned at an upper portion thereof, durability may be deteriorated due to excessive heat generation caused by a bottleneck or concentration of current flowing through the bus bar.

The above information disclosed in this Background section is only for enhancement of understanding of the background of the invention, and therefore it may contain information that does not form the prior art that is already known in this country to a person of ordinary skill in the art.

SUMMARY

The present disclosure has been made in an effort to provide a rechargeable battery pack that may prevent excessive heat generation by dispersing current flow through a bus bar.

An embodiment of the present disclosure provides a rechargeable battery pack including: a battery housing provided with an inner space; a series of unit battery cells accommodated in the inner space, each unit battery cell including a first electrode terminal and a second electrode terminal at respective upper and lower portions thereof; and a bus bar module electrically connected to the first electrode terminal and the second electrode terminal of each unit battery cell.

The bus bar module may include: a first bus bar electrically connected to the first electrode terminal at the upper portion of the series of unit battery cells; a second bus bar electrically connected to the second electrode terminal at the lower portion of the series of unit battery cells; and a connector part electrically connected to the first bus bar and the second bus bar.

The first bus bar may include: a first bus bar plate at the upper portion of the first electrode terminal of some unit battery cells of the series of unit battery cells; and a series of first connection protrusions protruding from the first bus bar plate and electrically connected to the first electrode terminals of some unit battery cells of the series of unit battery cells.

The second bus bar may include: a second bus bar plate at the lower portion of the second electrode terminals of some other unit battery cells of the series of unit battery cells; and a series of first connection protrusions protruding from the second bus bar plate and electrically connected to the second electrode terminals of the some other battery cells adjacent to some unit battery cells of the series of the unit battery cells.

The connector part may include a connector member that electrically connects the first bus bar plate and the second bus bar plate.

The connector member may be electrically connected between the first bus bar plate and the second bus bar plate at an inclined angle.

One side of the connector member may be electrically connected to the first bus bar plate by a first inclined protrusion, and the other side of the connector member may be electrically connected to the second bus bar plate by a second inclined protrusion.

The series of unit battery cells may be arranged in a zigzag configuration, and the connector member may be positioned within a separation space between the series of unit battery cells.

One connector member may be connected between central portions of the first bus bar plate and the second bus bar plate.

A plurality of connector members may be connected between central portions of the first bus bar plate and the second bus bar plate.

The connector member may include: at least one first connection member connected between one side edge of the first bus bar plate and one side edge of the second bus bar plate that face each other; and at least one second connection member connected between the other side edge of the first bus bar plate and the other side edge of the second bus bar plate that face each other.

The at least one first connection member may be one first connection member and the at least one second connection member may be one second connection member.

The at least one first connection member may include a series of first connection members and the at least one second connection member may include a series of second connection members.

According to embodiments of the present disclosure, the concentration of a current flowing through a bus bar may be prevented (or at least mitigated) and the current may be dispersed such that low heat generation due to the heat dissipation action is possible, thereby improving durability of the rechargeable battery pack.

DETAILED DESCRIPTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
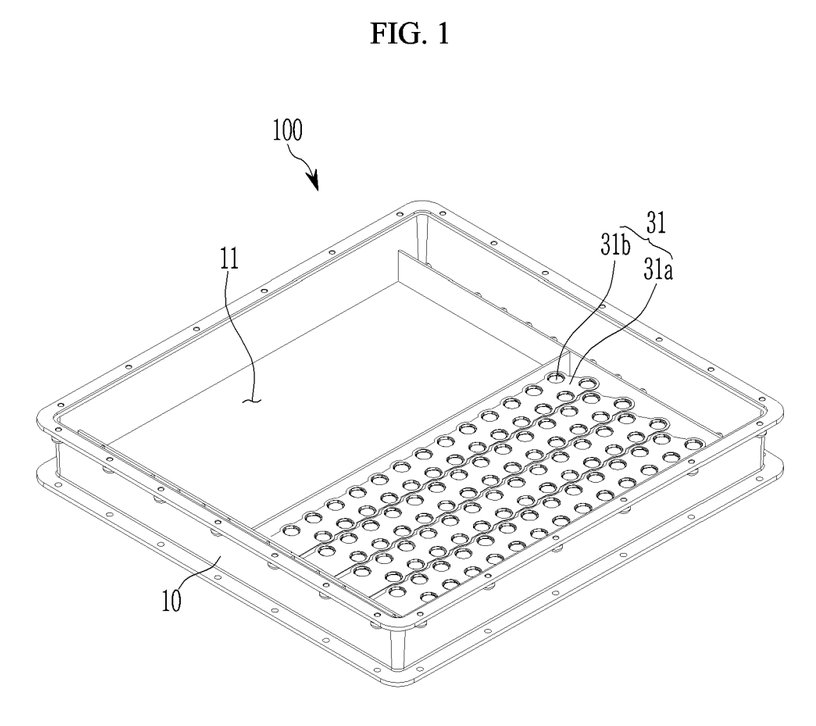
FIG. 1 illustrates a schematic perspective view of a rechargeable battery pack according to a first embodiment of the present disclosure.
Figure 2:
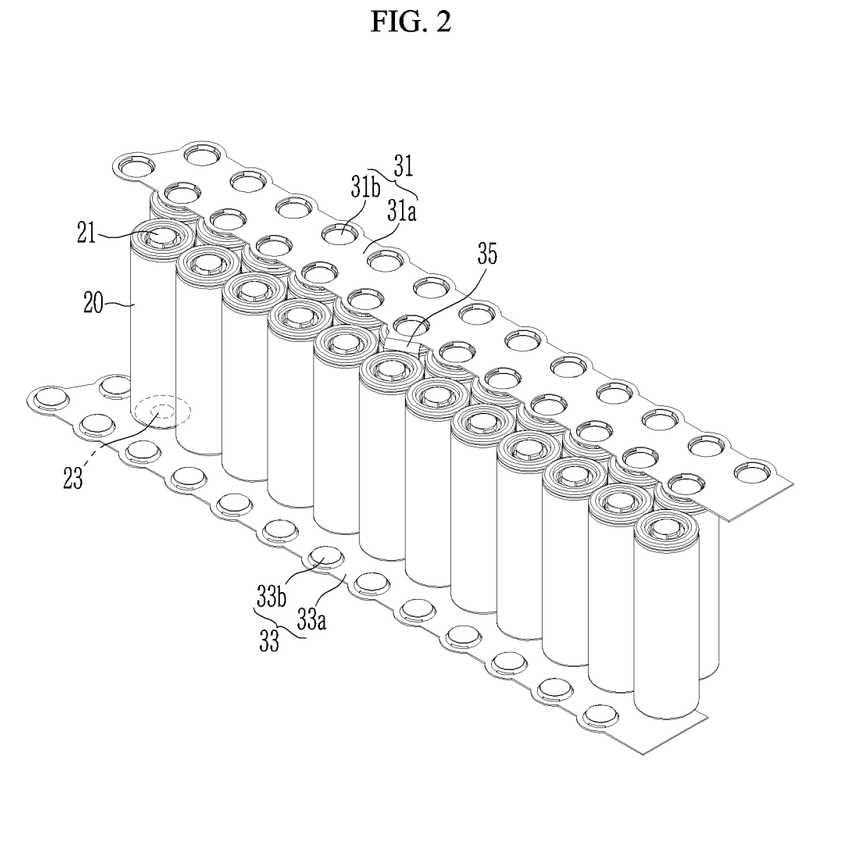
FIG. 2 illustrates a schematic perspective view of a state in which a bus bar module according to a first embodiment of the present disclosure is connected to a unit battery cell.
Figure 3:
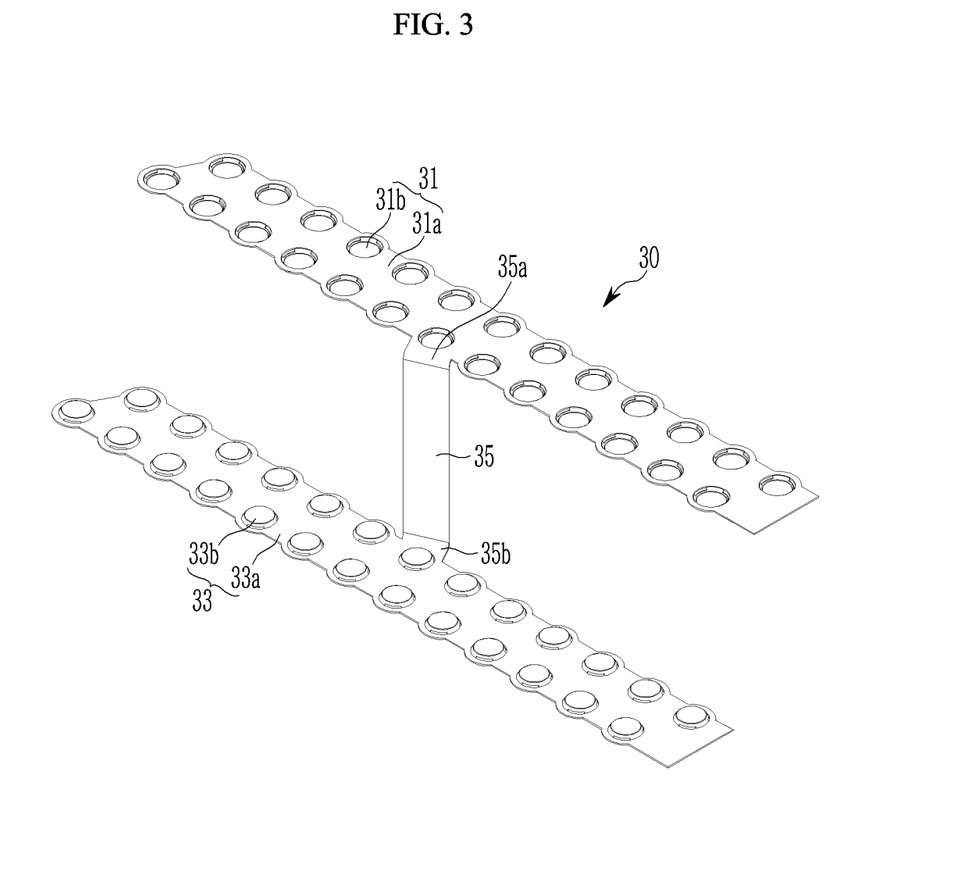
FIG. 3 illustrates a schematic perspective view of a bus bar module according to a first embodiment of the present disclosure.
Figure 4:
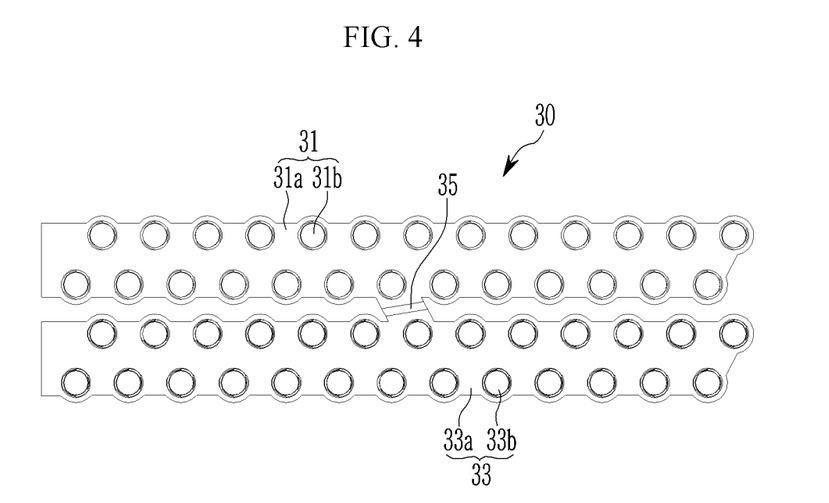
FIG. 4 illustrates a schematic top plan view of the bus bar module of FIG. 3.

FIG. 1 illustrates a schematic perspective view of a rechargeable battery pack according to a first embodiment of the present disclosure, FIG. 2 illustrates a schematic perspective view of a state in which a bus bar module according to a first embodiment of the present disclosure is connected to a unit battery cell, FIG. 3 illustrates a schematic perspective view of the bus bar module according to the first embodiment of the present disclosure, and FIG. 4 illustrates a schematic top plan view of the bus bar module of FIG. 3.

As shown in FIG. 1 to FIG. 4, a rechargeable battery pack 100 according to the first embodiment of the present disclosure includes a battery housing 10 in which an inner space 11 is formed, a plurality of unit battery cells 20 each including a first electrode terminal 21 and a second electrode terminal 23 that are inserted into an inner space of the battery cell 20 and formed at upper and lower portions, respectively, of the unit battery cell 20, and a bus bar module 30 electrically connected to the first electrode terminal 21 and the second electrode terminal 23 of the unit battery cells 20.

In the illustrated embodiment, the battery housing 10 is formed in a rectangular parallelepiped shape, and the inner space 11 is formed therein. In the present embodiment, the battery housing 10 is described as having a rectangular parallelepiped shape, but it is not necessarily limited thereto, and may be changed to various shapes, such as a cylindrical shape.

The unit battery cells 20 may be accommodated in the inner space 11 of the battery housing 10.

The battery housing 10 may be closed and sealed with a cover part (not shown) in a state in which the unit battery cells 20 are accommodated in the inner space 11.

In one or more embodiments, each of the unit battery cells 20 may be cylindrical rechargeable battery in which charging and discharging may be repeatedly performed.

In the illustrated embodiment, a plurality of unit battery cells 20 are arranged in a plurality of columns and rows inside the battery housing 10, and, for each of the unit battery cells 20, the first electrode terminal 21 may be positioned at an upper portion thereof and the second electrode terminal 23 may be positioned at a lower portion thereof. That is, the first electrode terminals 21 and the second electrode terminals 23 of the plurality of unit battery cells 20 may be respectively arranged in the same direction (e.g., the unit battery cells 20 are oriented such that all of the first electrode terminals 21 are arranged upward and all of the second electrode terminals 23 are arranged downward). In addition, as shown in FIG. 2, the plurality of unit battery cells 20 may be adjacent to each other in a zigzag shape (e.g., a staggered arrangement) to save space compared to an arrangement in which the unit battery cells 20 are not staggered.

Since the plurality of unit battery cells 20 are disposed to be adjacent to each other, and the first electrode terminals 21 are formed at the upper side of the unit battery cells 20 and the second electrode terminals 23 are formed on the lower side of the unit battery cells 20, the unit battery cells 20 may be connected to the bus bar module 30 by laser welding in a state in which they do not cross each other by changing directions.

In one or more embodiments, a vent part through which a gas is discharged is formed at the upper portion of the unit battery cell 20, and thus the gas of the plurality of unit battery cells 20 is all discharged in the same direction (upper direction), thereby achieving the stable discharge flow of gas.

Additionally, in the illustrated embodiment, the bus bar module 30 is connected to each of the upper and lower portions of the unit battery cell 20, and is electrically connected to the first electrode terminals 21 at the upper portions of the unit battery cells 20, and to the second electrode terminals 23 at the lower portions of the unit battery cells 20. In one or more embodiments, the first electrode terminal 21 may be a positive electrode, and the second electrode terminal 23 may be a negative electrode, but the present disclosure is not limited thereto, and the first electrode terminal 21 may be a negative electrode, and the second electrode terminal 23 may be a positive electrode.

In the illustrated embodiment, the bus bar module 30 includes a first bus bar 31 electrically connected to the first electrode terminals 21 at an upper portion of a first battery cell module formed of some unit battery cells 20 among the plurality of unit battery cells 20, a second bus bar 33 electrically connected to the second electrode terminals 23 at a lower portion of a second battery cell module formed of some other battery unit cells 20 among the plurality of unit battery cells 20 adjacent to the first battery cell module, and a connector part 35 electrically connecting the first bus bar 31 and the second bus bar 33 to each other. For example, the bus bar module 30 may connect the first battery cell module and the second battery cell module adjacent to each other in series.

The rechargeable battery pack of the embodiment of the present disclosure may include a plurality of bus bar modules 30. In such an embodiment, the battery cell module connected to the first bus bar 31 of one bus bar module 30 may be connected to the second bus bar 33 of the adjacent bus bar module 30.

For example, when the bus bar module connecting the first and second battery cell modules described above is referred to as a first bus bar module, the first bus bar 31 of the second bus bar module adjacent thereto may be electrically connected to the first electrode terminals 21 of the second battery cell module that are connected to the second bus bar 33 of the first bus bar module.

The first bus bar 31 may be disposed so that the first bus bar 31 is electrically connected to the first electrode terminals 21 formed at upper portions of the plurality of unit battery cells 20, which are all oriented or arranged in the same direction.

The first bus bar 31 may be formed in a plate shape at the upper portion of each of the unit battery cells 20, and the first bus bar 31 may be electrically connected to each of the first electrode terminals 21 by laser welding.

In one or more embodiments, the first bus bar 31 may include a first bus bar plate 31a connected to an upper portion of the first electrode terminals 21 of the plurality of unit battery cells 20, and a plurality of first connection protrusions 31b protruding from the first bus bar plate 31a and electrically connected to the first electrode terminals 21.

The first bus bar plate 31a is formed in a size corresponding to a size in which the unit battery cells 20 connected thereto are arranged, and a plurality of first connection protrusions 31b may protrude from the lower portion of the first bus bar plate 31a.

In one or more embodiments, the first connection protrusions 31b integrally protrude from the lower portion of the first bus bar plate 31a, and may surface-contact and be electrically connected to the first electrode terminals 21.

That is, the plurality of first connection protrusions 31b protrudes from the lower portion of the first bus bar plate 31a, and the plurality of first connection protrusions 31b are formed in a plurality of rows and columns corresponding to arrangement of the unit battery cells 20 connected by the first bus bar plate 31a. Although the plurality of first connection protrusions 31b are described and depicted as being formed in two rows along a length direction, they may also be appropriately formed in more than two rows along the length direction.

Additionally, the second bus bar 33 may be electrically connected to the second electrode terminals 23 formed at the lower portion of the plurality of unit battery cells 20.

The second bus bar 33 may be formed in a plate shape at the lower portion of each of the unit battery cells 20, and the second bus bar 33 may be electrically connected to the second electrode terminals 23 by laser welding.

In one or more embodiments, the second bus bar 33 may include a second bus bar plate 33a positioned at a lower portion of the second electrode terminals 23 of the plurality of unit battery cells 20, and a plurality of second connection protrusions 33b protruding from the second bus bar plate 33a and electrically connected to the second electrode terminals 23.

The second bus bar plate 33a is formed in a size corresponding to a size in which the unit battery cells 20 connected thereto are arranged, and a plurality of second connection protrusions 33b may protrude from the upper portion of the second bus bar plate 33a.

In one or more embodiments, the second connection protrusions 33b integrally protrude from the upper portion of the second bus bar plate 33a, and may surface-contact and be electrically connected to the second electrode terminals 23.

That is, the plurality of second connection protrusions 33b protrudes from the upper portion of the second bus bar plate 33a, and the plurality of second connection protrusions 33b are formed in a plurality of rows and columns corresponding to arrangement of the unit battery cells 20 connected by the second bus bar plate 33a. Although the plurality of second connection protrusions 33b are described and depicted as being formed in two rows along a length direction, they may also be appropriately formed in more than two rows along the length direction.

The first bus bar 31 and the second bus bar 33 described above may be formed in the same or similar shape to connect the same number of unit battery cells 20.

The first bus bar 31 and the second bus bar 33 may be connected to each other by the connector part 35.

The connector part 35 may be formed as a connector member that is electrically connected to the first bus bar 31 and the second bus bar 33. Hereinafter, the connector part and the connector member use the same reference number.

One side of the connector member 35 may be electrically connected to a central portion of the first bus bar 31, and the other side thereof may be electrically connected to a central portion of the second bus bar 33.

The connector member 35 may electrically connect the first bus bar 31 and the second bus bar 33 in an inclined state.

That is, one side of the connector member 35 may be connected in an inclined orientation to the first bus bar plate 31a by a first inclined protrusion 35a, and the other side of the connector member 35 may be connected in an inclined orientation to the second bus bar plate 33a by a second inclined protrusion 35b.

The first inclined protrusion 35a and the second inclined protrusion 35b may be connected in an inclined orientation to the first bus bar plate 31a and the second bus bar plate 33a at the same angle. The first inclined protrusion 35a and the second inclined protrusion 35b may both be connected in an inclined orientation to the first bus bar plate 31a and the second bus bar plate 33a at an acute angle (e.g., within a range of acute angles) with respect to a length direction of the first bus bar plate 31a and the second bus bar plate 33a.

In one or more embodiments of the present disclosure, the first inclined protrusion 35a and the second inclined protrusion 35b of the connector member 35 may be connected between the first bus bar plate 31a and the second bus bar plate 33a at an inclination angle of 30 degrees to 60 degrees with respect to the length directions of the first bus bar plate 31a and the second bus bar plate 33a. In one embodiment, the first inclined protrusion 35a and the second inclined protrusion 35b of the connector member 35 may be connected thereto at an inclination angle of 45 degrees with respect to the length direction of the first bus bar plate 31a and the second bus bar plate 33a.

Accordingly, the connector member 35 is obliquely connected between the first bus bar plate 31a and the second bus bar plate 33a, and may be positioned within a separation space between a plurality of unit battery cells 20 disposed in a zigzag shape (e.g., a staggered orientation). That is, since the connector member 35 in a width direction is obliquely connected to the first bus bar plate 31a and the second bus bar plate 33a along the length direction, a space due to the connector member 35 is not required (e.g., the unit battery cells 20 need not be spaced to make additional room for the connector member 35), thereby improving space efficiency.

One connector member 35 may be connected between the first bus bar plate 31a and the second bus bar plate 33a, and may be formed to have a first width.

In the illustrated embodiment, the connector member 35 connects substantially lengthwise central positions or portions of the first bus bar plate 31a and the second bus bar plate 33a to each other (i.e., the connector member 35 is centered or substantially centered along a lengthwise direction of the first bus bar plate 31a and the second bus bar plate 33a), compared to an embodiment in which the connector member 35 connects ends of the first bus bar plate 31a and the second bus bar plate 33a to each other. Accordingly, it is possible to effectively distribute the current flowing between the first bus bar plate 31a and the second bus bar plate 33a during the operation of the rechargeable battery pack 100.

That is, since the current flows through the central position or portion in the lengthwise direction in the process of flowing from the first bus bar plate 31a to the second bus bar plate 33a, the current may not be concentrated on one side or end, but may flow in a dispersed or distributed manner through the first bus bar plate 31a and the second bus bar plate 33a.

Therefore, during the operation of the rechargeable battery pack 100, since the concentration of current may not occur, and the bottleneck of the current between the first bus bar plate 31a and the second bus bar plate 33a may be prevented, and the current may be dispersed, it is possible to improve the durability of the rechargeable battery pack 100 by enabling a low heat generation effect due to heat dissipation.

Figure 5:
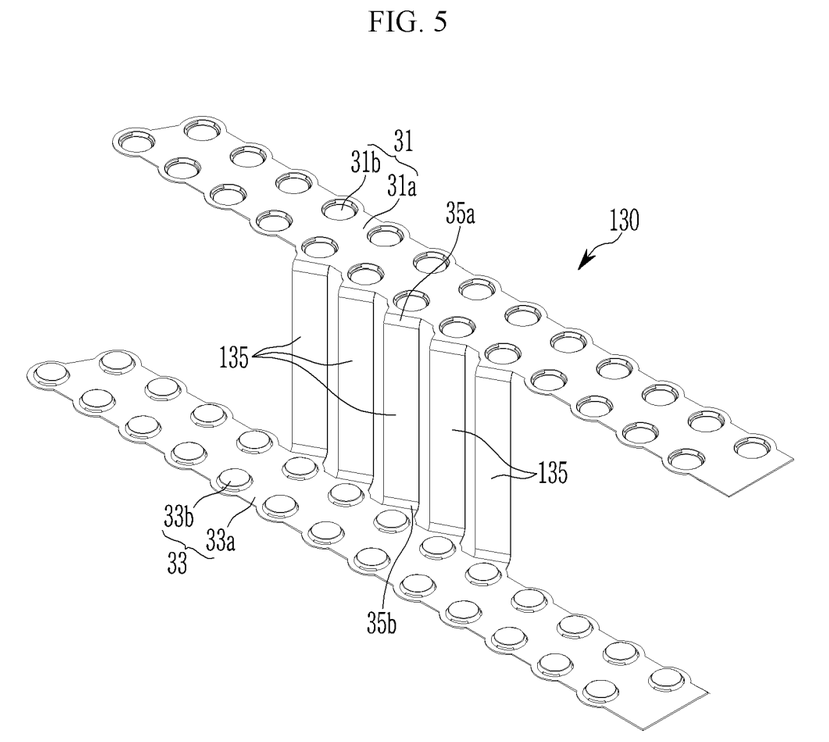
FIG. 5 illustrates a schematic perspective view of a bus bar module according to a second embodiment of the present disclosure.
Figure 6:
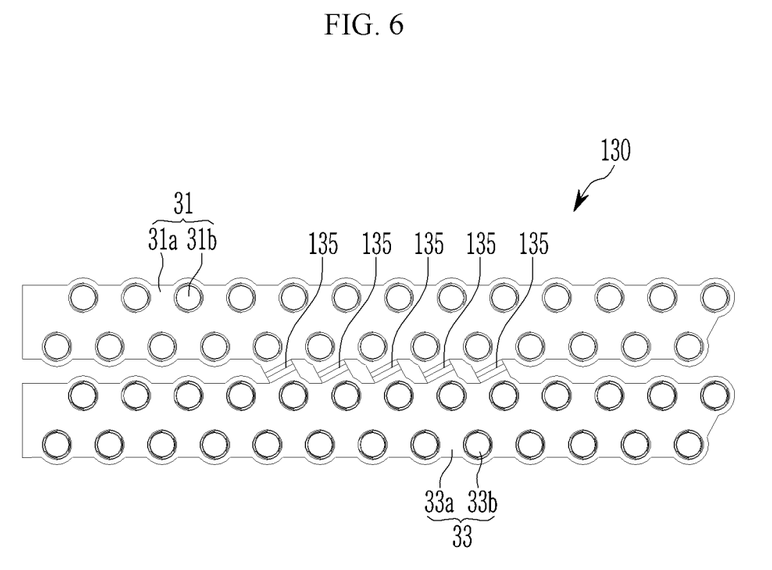
FIG. 6 illustrates a schematic top plan view of the bus bar module of FIG. 5.

FIG. 5 illustrates a schematic perspective view of a bus bar module according to a second embodiment of the present disclosure, and FIG. 6 illustrates a schematic top plan view of the bus bar module of FIG. 5. The same reference numerals as those in FIG. 1 to FIG. 4 refer to the same or similar members having the same or similar functions. A detailed description of the same reference numerals will be omitted hereinafter.

As shown in FIG. 5 and FIG. 6, a plurality of connector members 135 of the bus bar module 130 of the rechargeable battery pack according to the second embodiment of the present disclosure may be connected between central positions or portions (in the lengthwise direction) of the first bus bar plate 31a and the second bus bar plate 33a.

The plurality of connector members 135 may be spaced apart from each other in the lengthwise direction and be connected between the first bus bar plate 31a and the second bus bar plate 33a.

The plurality of connector members 135 may be connected between the first bus bar plate 31a and the second bus bar plate 33a in multiple. Each of a plurality of connector members 135 may have a second width. In one or more embodiments, the second width of each of the connector members 135 may be smaller than the first width of the connector member 35 (see FIG. 3) of the above-described first embodiment.

The connector member 135 may be obliquely connected between the first bus bar plate 31a and the second bus bar plate 33a by the first inclined protrusion 35a and the second inclined protrusion 35b.

In the illustrated embodiment, the connector members 135 connect substantially lengthwise central positions or portions of the first bus bar plate 31a and the second bus bar plate 33a to each other, and thus it is possible to even more effectively distribute the current flowing between the first bus bar plate 31a and the second bus bar plate 33a during the operation of the rechargeable battery pack 100, compared to the first embodiment described above.

Figure 7:
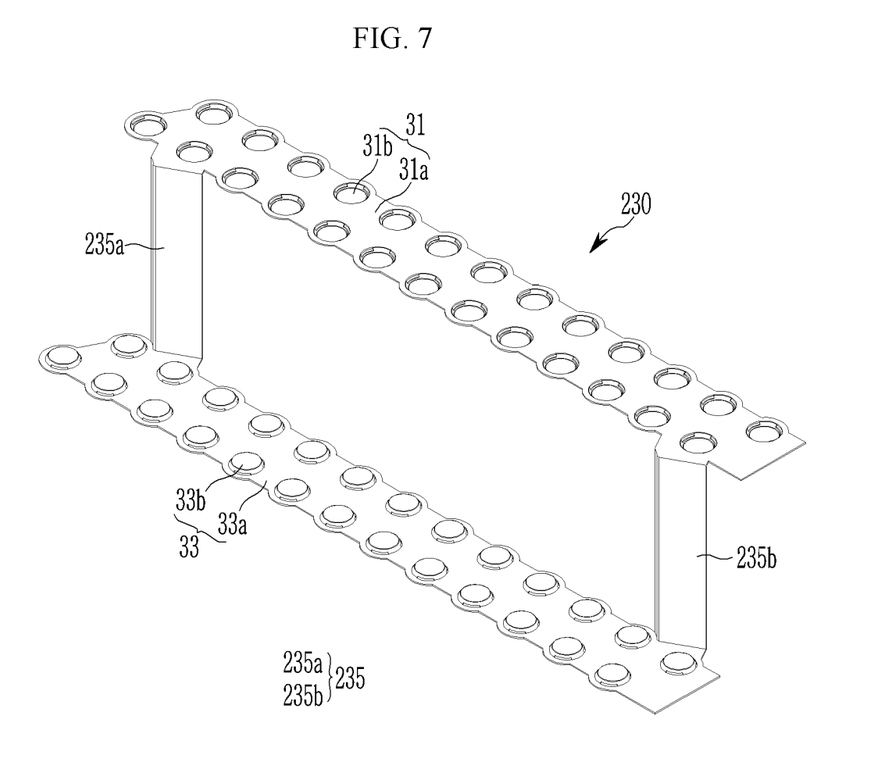
FIG. 7 illustrates a schematic perspective view of a bus bar module according to a third embodiment of the present disclosure.
Figure 8:
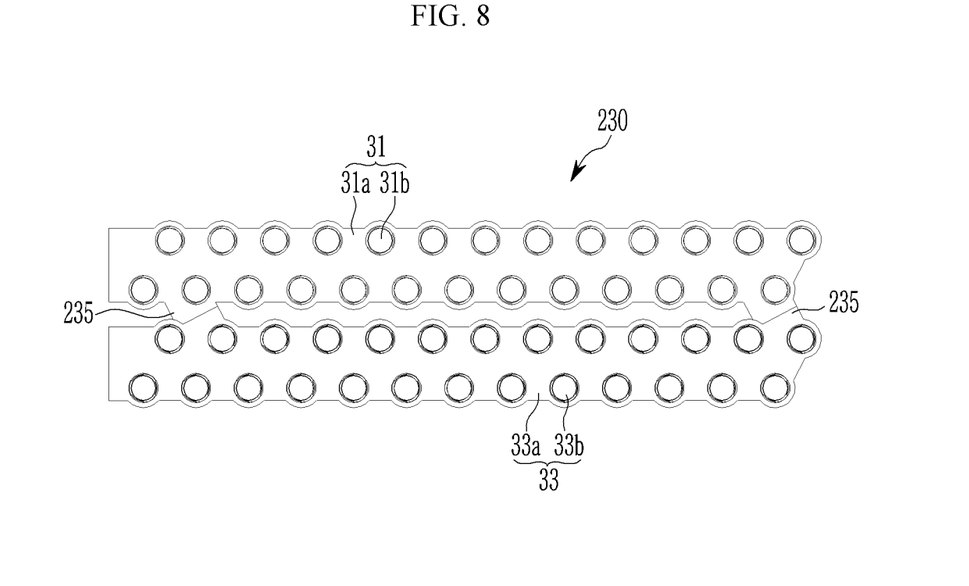
FIG. 8 illustrates a schematic top plan view of the bus bar module of FIG. 7.

FIG. 7 illustrates a schematic perspective view of a bus bar module according to a third embodiment of the present disclosure, and FIG. 8 illustrates a schematic top plan view of the bus bar module of FIG. 7. The same reference numerals as those in FIG. 1 to FIG. 6 refer to the same or like members having the same or like functions. A detailed description of the same reference numerals will be omitted hereinafter.

As shown in FIG. 7 and FIG. 8, a connector 235 of a bus bar module 230 of a rechargeable battery pack according to the third embodiment of the present disclosure may include a first connection member 235a connected between one pair of side edges (or end portions along the lengthwise direction) of the first bus bar plate 31a and the second bus bar plate 33a, and a second connection member 235b connected between the other pair of side edges (or end portions along the lengthwise direction) of the first bus bar plate 31a and the second bus bar plate 33a.

One first connection member 235a may be connected between one side edge (or one end portion) of the first bus bar plate 31a and one side edge (or one end portion) of the second bus bar plate 33a that face each other.

In addition, one second connection member 235b may connect the other side edge (or the other end portion) of the first bus bar plate 31a and the other side edge (or the other end portion) of the second bus bar plate 33a that face the other.

The first connection member 235a and the second connection member 235b may be connected between both sides (or lengthwise end portions) of the first bus bar plate 31a and the second bus bar plate 33a with the same length, and the first connection member 235a and the second connection member 235b may be formed with a third width.

As described above, since one first connection member 235a and one second connection member 235b are connected between both sides (or both lengthwise end portions) of the first bus bar plate 31a and the second bus bar plate 33a, compared to the first embodiment in which a single connection member 35 connects lengthwise central portions of the first and second bus bar plates 31a and 33a, the current flowing between the first bus bar plate 31a and the second bus bar plate 33a may be dispersed, and thus it is possible to improve the durability of the rechargeable battery pack 100 by enabling a low heat generation effect due to heat dissipation.

Figure 9:
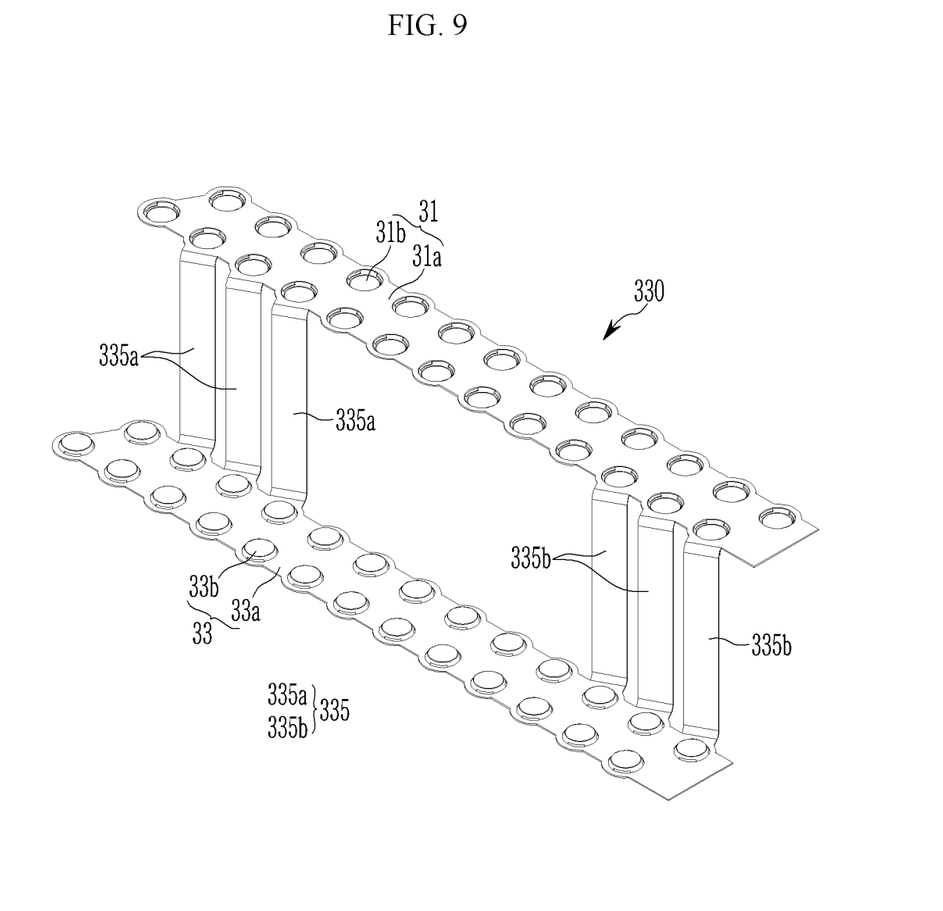
FIG. 9 illustrates a schematic perspective view of a bus bar module according to a fourth embodiment of the present disclosure.
Figure 10:
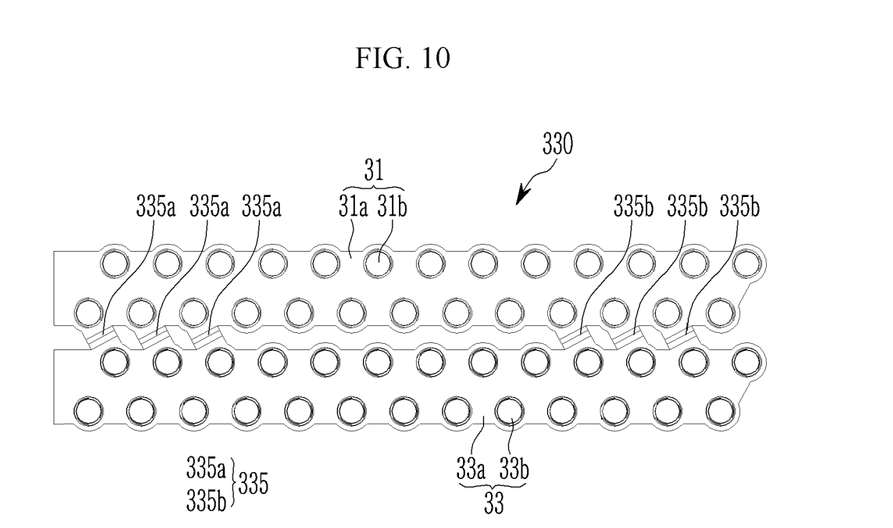
FIG. 10 illustrates a schematic top plan view of the bus bar module of FIG. 9.

FIG. 9 illustrates a schematic perspective view of a bus bar module according to a fourth embodiment of the present disclosure, and FIG. 10 illustrates a schematic top plan view of the bus bar module of FIG. 9. The same reference numerals as those in FIG. 1 to FIG. 8 refer to the same or like members having the same or like functions. A detailed description of the same reference numerals will be omitted hereinafter.

As shown in FIG. 9 and FIG. 10, a connector 335 of a bus bar module 330 of a rechargeable battery pack according to the fourth embodiment of the present invention may include a plurality of first connection members 335a connected between side edges (or first lengthwise end portions) of the first bus bar plate 31a and the second bus bar plate 33a, and a plurality of second connection members 335b connected between the other side edges (or second lengthwise end portions) of the first bus bar plate 31a and the second bus bar plate 33a.

The plurality of first connection members 335a may be connected between one side edge (or one lengthwise end portion) of the first bus bar plate 31a and one side edge (or one lengthwise end portion) of the second bus bar plate 33a that face each other. Each of the plurality of first connection members 335a may have a fourth width. In one or more embodiments, the fourth width of the first connection member 335a may be smaller than the third width of the connector member 235 (see FIG. 7) of the third embodiment described above.

The plurality of second connection members 335b may be connected between the other side edge (or the other lengthwise end portion) of the first bus bar plate 31a and the other side edge (or the other lengthwise end portion) of the second bus bar plate 33a that face each other, and the second connection members 335b may have the same fourth width as the first connection members 335a.

As described above, since the plurality of first connection members 335a and the plurality of second connection members 335b are connected between both sides (or both lengthwise end portions) of the first bus bar plate 31a and the second bus bar plate 33a, compared to the third embodiment in which a single connection member 235a, 235b is connected between each side or lengthwise end portion of the bus bar plates 31a and 33a, the current flowing between the first bus bar plate 31a and the second bus bar plate 33a may be further dispersed, and thus it is possible to improve the durability by enabling a low heat generation effect due to heat dissipation.

Figure 11:
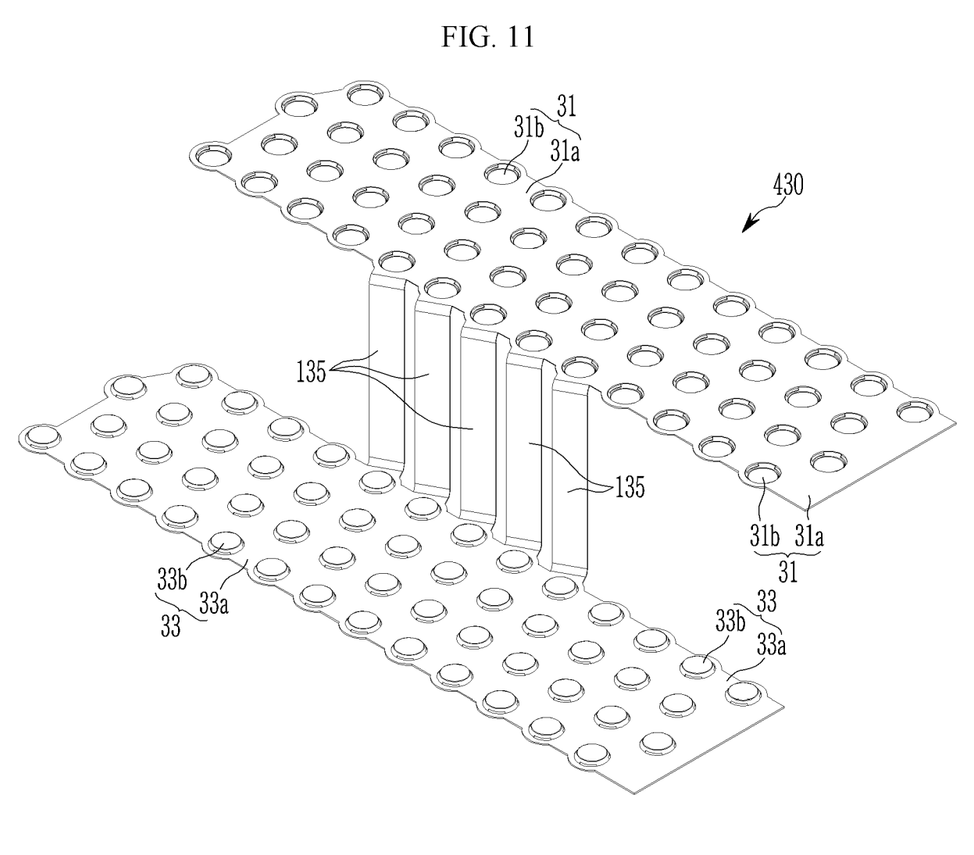
FIG. 11 illustrates a schematic perspective view of a bus bar module according to a fifth embodiment of the present disclosure.

FIG. 11 illustrates a schematic perspective view of a bus bar module according to a fifth embodiment of the present invention. The same reference numerals as those in FIG. 1 to FIG. 10 refer to the same or like members having the same or like functions. A detailed description of the same reference numerals will be omitted hereinafter.

As shown in FIG. 11, in a bus bar module 430 of a rechargeable battery pack according to the fifth embodiment of the present disclosure, the first bus bar plate 31a may have a structure in which a plurality of first bus bar plates of the first to fourth embodiments described above are connected to each other (or integrated into each other). In addition, the second bus bar plate 33a may have a structure in which a plurality of second bus bar plates of the first to fourth embodiments described above are connected to each other (or integrated into each other).

Therefore, the bus bar module 30 of the present embodiment may be appropriately extended according to a standard (e.g., a size) of the rechargeable battery pack.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 10 . . . battery housing | 11 . . . inner space |
| 20 . . . unit battery cell | 21 . . . first electrode terminal |
| 23 . . . second electrode terminal | 31a . . . first bus bar plate |
| 30, 130, 230, 330 . . . bus bar module | 33 . . . second bus bar |
| 31 . . . first bus bar | 33b . . . second connection protrusion |
| 31b . . . first connection protrusion | 135, 235, 335 . . . connector member |
| 33a . . . second bus bar plate | |
| 35 . . . connector part, connector member | |
| 35a . . . first inclined protrusion | |
| 35b . . . second inclined protrusion | |

| Description of symbols | |
|---|---|
| 235a, 335a . . . first connection member | |
| 235b, 335b . . . second connection member | |

What is claimed is:

1. A rechargeable battery pack comprising:
a battery housing comprising an inner space;
a plurality of unit battery cells accommodated in the inner space, each unit battery cell of the plurality of unit battery cells comprising a first electrode terminal and a second electrode terminal at respective upper and lower portions thereof; and
a bus bar module electrically connected to the first electrode terminal and the second electrode terminal of each unit battery cell,
wherein the bus bar module comprises:
a first bus bar electrically connected to the first electrode terminal at the upper portion of each unit battery cell of the plurality of unit battery cells;
a second bus bar electrically connected to the second electrode terminal at the lower portion of each unit battery cell of the plurality of unit battery cells; and
a connector part electrically and obliquely connected to the first bus bar and the second bus bar,
wherein a width direction of the connector part is obliquely oriented with respect to a length direction of each of the first bus bar and the second bus bar.

2. The rechargeable battery pack of claim 1, wherein the first bus bar includes:
a first bus bar plate at the upper portion of the first electrode terminal of some unit battery cells of the plurality of unit battery cells; and
a plurality of first connection protrusions protruding from the first bus bar plate and electrically connected to the first electrode terminal of some unit battery cells of the plurality of unit battery cells.

3. The rechargeable battery pack of claim 2, wherein the second bus bar includes:
a second bus bar plate at the lower portion of the second electrode terminal of some other unit battery cells of the plurality of unit battery cells; and
a plurality of first connection protrusions protruding from the second bus bar plate and electrically connected to the second electrode terminal of the some other battery cells adjacent to the some unit battery cells of the plurality of the unit battery cells.

4. The rechargeable battery pack of claim 3, wherein the connector part comprises a connector member that electrically connects the first bus bar plate and the second bus bar plate.

5. The rechargeable battery pack of claim 4, wherein the connector member is electrically connected between the first bus bar plate and the second bus bar plate at an inclined angle relative to a lengthwise direction of the first bus bar and the second bus bar.

6. The rechargeable battery pack of claim 5, wherein one side of the connector member is electrically connected to the first bus bar plate by a first inclined protrusion, and another side of the connector member is electrically connected to the second bus bar plate by a second inclined protrusion.

7. The rechargeable battery pack of claim 5, wherein:
adjacent unit battery cells of the plurality of unit battery cells are arranged in a zigzag shape, and the connector member is within a separation space between the plurality of unit battery cells.

8. The rechargeable battery pack of claim 4, wherein one connector member is connected between lengthwise central portions of the first bus bar plate and the second bus bar plate.

9. The rechargeable battery pack of claim 4, wherein a plurality of connector members are connected between lengthwise central portions of the first bus bar plate and the second bus bar plate.

10. The rechargeable battery pack of claim 4, wherein the connector member includes:
- at least one first connection member connected between one side edge of the first bus bar plate and one side edge of the second bus bar plate that face each other; and
- at least one second connection member connected between another side edge of the first bus bar plate and another side edge of the second bus bar plate that face each other.

11. The rechargeable battery pack of claim 10, wherein the at least one first connection member is one first connection member, and wherein the at least one second connection member is one second connection member.

12. The rechargeable battery pack of claim 10, wherein:
- the at least one first connection member comprises a plurality of first connection members and the at least one second connection member comprises a plurality of second connection members.

\* \* \* \* \*

UNITED STATES PATENT AND TRADEMARK OFFICE
CERTIFICATE OF CORRECTION

PATENT NO. : 11,901,583 B2
APPLICATION NO. : 17/246907
DATED : February 13, 2024
INVENTOR(S) : Hyeok Lee et al.

Page 1 of 1

It is certified that error appears in the above-identified patent and that said Letters Patent is hereby corrected as shown below:

In the Claims

In Column 10, Line 27, in Claim 1, after "electrically" delete "and obliquely".

Signed and Sealed this
Ninth Day of July, 2024

Katherine Kelly Vidal
*Director of the United States Patent and Trademark Office*